US008954704B2

(12) United States Patent
Cardona et al.

(10) Patent No.: US 8,954,704 B2
(45) Date of Patent: Feb. 10, 2015

(54) DYNAMIC NETWORK ADAPTER MEMORY RESIZING AND BOUNDING FOR VIRTUAL FUNCTION TRANSLATION ENTRY STORAGE

(75) Inventors: Omar Cardona, Cedar Park, TX (US); Vinit Jain, Austin, TX (US); Jayakrishna Kidambi, Santa Clara, CA (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 13/209,253

(22) Filed: Aug. 12, 2011

(65) Prior Publication Data

US 2013/0042237 A1 Feb. 14, 2013

(51) Int. Cl.
G06F 12/00 (2006.01)
G06F 12/02 (2006.01)

(52) U.S. Cl.
CPC .................................. *G06F 12/0284* (2013.01)
USPC ............................ 711/170; 711/103; 711/171

(58) Field of Classification Search
CPC ............ G06F 12/00; G06F 2213/3808; G06F 15/1735; G06F 12/02; G06F 12/08
USPC .......................................... 711/171, 103, 170
See application file for complete search history.

(56) References Cited

U.S. PATENT DOCUMENTS

| 5,293,487 | A | * | 3/1994 | Russo et al. | 709/250 |
| 5,412,787 | A | | 5/1995 | Forsyth et al. | 395/400 |
| 7,493,465 | B2 | | 2/2009 | Susairaj et al. | 711/203 |
| 7,756,943 | B1 | | 7/2010 | Wong | |
| 7,823,151 | B2 | | 10/2010 | Seth et al. | |
| 8,396,946 | B1 | | 3/2013 | Brandwine et al. | |
| 8,725,898 | B1 | | 5/2014 | Vincent | |
| 2002/0009075 | A1 | | 1/2002 | Fesas, Jr. | 370/363 |
| 2002/0078271 | A1 | | 6/2002 | Berry | 710/36 |
| 2004/0078532 | A1 | * | 4/2004 | Tremaine | 711/160 |
| 2004/0215917 | A1 | | 10/2004 | Lambeth et al. | |

(Continued)

FOREIGN PATENT DOCUMENTS

| CN | 1863169 A | 11/2006 |
| CN | 101043428 A | 9/2007 |
| JP | 11-194972 A | 7/1999 |

OTHER PUBLICATIONS

International Search Report and Written Opinion for PCT Application PCT/IB2012/053597, mailed Dec. 11, 2012, 8 pages.
International Search Report and Written Opinion for PCT Application PCT/IB2012/054039, mailed Jan. 17, 2013, 10 pages.
U.S. Appl. No. 13/204,211, filed Aug. 2011, Cardona et al.

(Continued)

*Primary Examiner* — Aimee Li
*Assistant Examiner* — Christopher Do
(74) *Attorney, Agent, or Firm* — VanLeeuwen & VanLeeuwen; Thomas E. Tyson

(57) ABSTRACT

An approach is provided which a system selects a first virtual function from a plurality of virtual functions executing on a network adapter that includes a memory area. Next, the system allocates, in the memory area, a memory corresponding to the first virtual function. The system then stores one or more translation entries in the allocated memory partition, which are utilized to send data traversing through the first virtual function. As such, the system sends, utilizing one or more of the translation entries, the data packets from the network adapter to one or more destinations. In turn, the system dynamically resizes the memory partition based upon an amount of the memory partition that is utilized to store the one or more translation entries.

16 Claims, 15 Drawing Sheets

(56) References Cited

U.S. PATENT DOCUMENTS

| | | | |
|---|---|---|---|
| 2005/0190703 A1 | 9/2005 | Sumimoto | |
| 2005/0278488 A1* | 12/2005 | Flemming et al. | 711/153 |
| 2006/0026383 A1 | 2/2006 | Dinechin et al. | |
| 2006/0224815 A1 | 10/2006 | Yamada et al. | |
| 2007/0073832 A1 | 3/2007 | Curtis et al. | 709/217 |
| 2007/0283125 A1 | 12/2007 | Manczak et al. | |
| 2008/0002663 A1 | 1/2008 | Tripathi et al. | |
| 2008/0091915 A1 | 4/2008 | Moertl et al. | 711/206 |
| 2008/0177952 A1 | 7/2008 | Morrow | |
| 2008/0201540 A1 | 8/2008 | Sahita et al. | |
| 2008/0240098 A1 | 10/2008 | Uttaro et al. | |
| 2010/0107162 A1 | 4/2010 | Edwards et al. | |
| 2010/0211947 A1 | 8/2010 | van Riel | |
| 2010/0332693 A1 | 12/2010 | Ben-Yehuda et al. | |
| 2011/0023027 A1 | 1/2011 | Kegel et al. | |
| 2011/0149980 A1 | 6/2011 | Patel et al. | |
| 2011/0271014 A1 | 11/2011 | Turner et al. | |
| 2012/0017029 A1 | 1/2012 | Santos et al. | |
| 2012/0079478 A1 | 3/2012 | Galles et al. | |
| 2012/0137062 A1 | 5/2012 | Arges et al. | |
| 2012/0290695 A1 | 11/2012 | Barabash et al. | |
| 2013/0033993 A1 | 2/2013 | Cardona et al. | |
| 2013/0034094 A1 | 2/2013 | Cardona et al. | |
| 2013/0034109 A1 | 2/2013 | Cardona et al. | |
| 2013/0042238 A1 | 2/2013 | Cardona et al. | |
| 2013/0042240 A1 | 2/2013 | Cardona et al. | |
| 2013/0097600 A1 | 4/2013 | Cardona et al. | |

OTHER PUBLICATIONS

U.S. Appl. No. 13/204,260, filed Aug. 2011, Cardona et al.

Final Office Action for U.S. Appl. No. 13/209,260 (Cardona et al., "Optimized Virtual Function Translation Entry Memory Caching," filed Aug. 12, 2011), U.S. Patent and Trademark Office, mailed Oct. 25, 2013, 23 pages.

Office Action for U.S. Appl. No. 13/561,010 (Cardona et al., "Dynamic Network Adapter Memory Resizing and Bounding for Virtual Function Translation Entry Storage," filed Jul. 28, 2012), U.S. Patent and Trademark Office, mailed Jul. 30, 2013, 28 pages.

Office Action for U.S. Appl. No. 13/209,260 (Cardona et al., "Optimized Virtual Function Translation Entry Memory Caching," filed Aug. 12, 2011), U.S. Patent and Trademark Office, mailed May 14, 2013, 31 pages.

Notice of Allowance for U.S. Appl. No. 13/209,260 (Cardona et al., "Optimized Virtual Function Translation Entry Memory Caching," filed Aug. 12, 2011), U.S. Patent and Trademark Office, mailed Feb. 14, 2014, 13 pages.

Office Action for U.S. Appl. No. 13/563,390 (Cardona et al., "Optimized Virtual Function Translation Entry Memory Caching," filed Jul. 31, 2012), U.S. Patent and Trademark Office, mailed May 12, 2014, 62 pages.

Notice of Allowance for U.S. Appl. No. 13/563,390 (Cardona et al., "Optimized Virtual Function Translation Entry Memory Caching," filed Jul. 31, 2012), U.S. Patent and Trademark Office, mailed Sep. 10, 2014, 8 pages.

* cited by examiner

DYNAMIC NETWORK ADAPTER MEMORY RESIZING AND BOUNDING FOR VIRTUAL FUNCTION TRANSLATION ENTRY STORAGE

BACKGROUND

The present disclosure relates to dynamically resizing memory partitions on a network adapter's onboard memory. More particularly, the present disclosure relates to allocating onboard memory partitions to virtual functions that execute on the network adapter and, in turn, dynamically resizing the memory partitions based upon translation entry storage requirements to store data packets traversing through the virtual functions.

Physical networks include switches and routers that transport data between host computing systems, storage locations, and other computing entities. Virtualization technology enables system administrators to shift physical resources into a "virtual" domain, which includes virtual networks, virtual machines, and virtual switches. Host computing systems may include a network interface card that, when virtualized, includes a corresponding virtual function for each virtual machine executing on the host computing system. As such, the virtual functions provide a "conduit" to send/receive data between the network interface card and the virtual machines.

BRIEF SUMMARY

According to one embodiment of the present disclosure, an approach is provided in which a system selects a first virtual function from a plurality of virtual functions executing on a network adapter that includes a memory area. Next, the system allocates, in the memory area, a memory corresponding to the first virtual function. The system then stores one or more translation entries in the allocated memory partition, which are utilized to send data traversing through the first virtual function. As such, the system sends, utilizing one or more of the translation entries, the data packets from the network adapter to one or more destinations. In turn, the system dynamically resizes the memory partition based upon an amount of the memory partition that is utilized to store the one or more translation entries.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
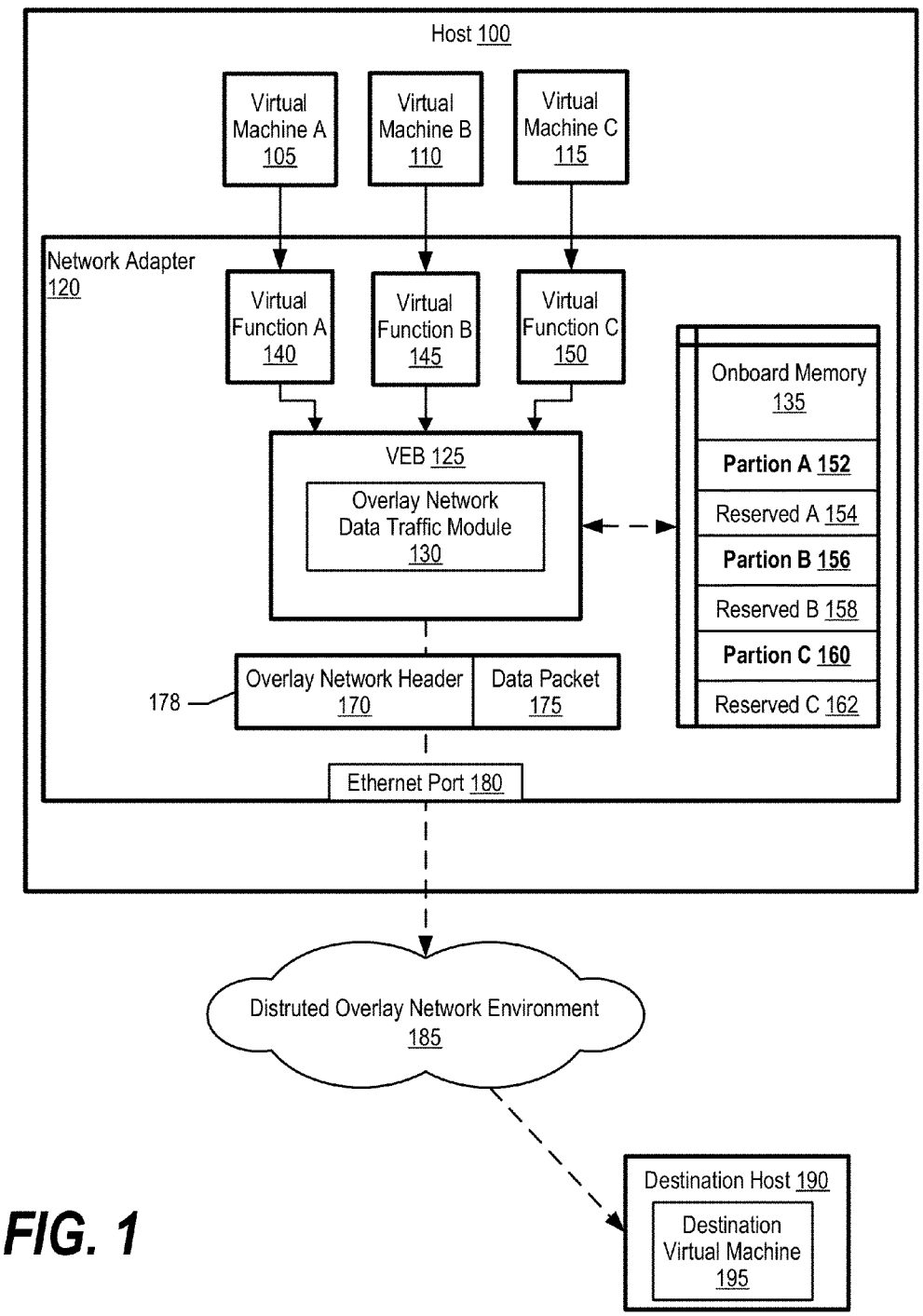
FIG. 1 is a diagram showing a virtual Ethernet bridge dynamically resizing onboard memory partitions based upon virtual machine utilization requirements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

The present disclosure describes a mechanism to dynamically resize memory partitions included on a network adapter's onboard memory. The memory partitions correspond to virtual functions executing on the network adapter, each of which having dynamic translation entry storage requirements. As such, the network adapter's onboard memory is utilized more efficiently and adverse side effects of multiple virtual functions executing on one network adapter is minimized (e.g., inter-partition boundary violations).

FIG. 1 is a diagram showing a virtual Ethernet bridge dynamically resizing onboard memory partitions based upon virtual machine utilization requirements. Host 100 is an information handling system (e.g., a server), and executes virtual machines 105-115. Virtual machines 105-115 may be provisioned by a hypervisor and execute independent operating systems.

During execution, virtual machines 105-115 may send data packets to destinations, such as to each other or to other virtual machines over distributed overlay network environment 185. Distributed overlay network environment 185 includes one or more virtual networks, each having their own unique overlay network identifier, which allows the virtual networks to operate concurrently over one or more physical networks. The virtual networks are logically overlayed onto the physical networks using logical policies that describe encapsulated data packet traversal between a source virtual machine and a destination virtual machine. As such, the virtual networks are independent of physical topology constraints of a physical network (e.g., router placements). The encapsulated data packets may traverse through multiple virtual networks, which may include traversing through physical entities such as switches, servers, and routers that comprise the physical networks (see FIGS. 12-13 and corresponding text for further details).

Host 100 also includes network adapter 120 (e.g., a network interface card), which includes virtual functions 140-150 (e.g., remote NIC's or remote adapters) that correspond to virtual machines 105-115. In one embodiment, virtual functions 140-150 may be limited feature PCIe adapters that allow virtual machines 105-115 to send/receive data packets directly to/from virtual Ethernet bridge 125, thus bypassing the hypervisor executing on host 100.

Virtual Ethernet bridge 125 includes overlay network data traffic module 130, which receives data packets from virtual machine 105-115. Overlay network data traffic module 170 identifies a destination virtual machine (destination virtual machine 195) and accesses onboard memory 135 to retrieve a translation entry that corresponds to the destination virtual machine's corresponding physical server (destination host 190).

Onboard memory 135 includes memory partitions 152, 156, and 160, which store translation entries for corresponding virtual functions 140-150, respectively. Virtual Ethernet bridge 125 dynamically resizes memory partitions 152, 156, and 158 using, for example, reserved memory 154, 158, and 162 based upon the amount of translation entries that virtual functions 140-150 utilize. The memory partitions may be resized in a contiguous manner, or they may be resized in a non-contiguous manner (see FIG. 7B and corresponding text for further details).

In one embodiment, the maximum memory bounds are established when the virtual functions are provisioned, and the memory partitions are set at a "preferred" partition size. During execution, the memory partition may grow/shrink within specified minimum and maximum partition sizes. In one embodiment, memory partitions are not made visible to the virtual machines and, memory partition management may occurs within network adapter 120.

Overlay network data traffic module 130 includes the translation entry information in overlay network header 170. Next, overlay network data traffic module 130 encapsulates data packet 175 with overlay network header 170 and sends encapsulated data packet 178 over distributed overlay network environment 185 through Ethernet port 180. Destination host 190 also includes an overlay network data traffic module, which decapsulates the encapsulated data packet and forwards the data packet to destination virtual machine 195 accordingly.

In one embodiment, overlay network data traffic module 130 may determine that the destination virtual machine is managed by the same virtual Ethernet bridge 125. In this embodiment, overlay network data traffic module 130 may not encapsulate the data, but instead send the data packet directly to the destination virtual machine via the destination virtual machine's corresponding virtual function.

In yet another embodiment, overlay network data traffic module 130 may receive control and routing information from a switch control module executing on a different virtual machine. In this embodiment, the switch control module provides the control and routing information through a switch function (see FIGS. 3, 5, and corresponding text for further details).

In yet another embodiment, off board memory may be portioned to store translation entries for particular virtual machines. Such off board memory may be managed by the corresponding virtual machine, the hypervisor, or a switch control module executing on a separate virtual machine. In this embodiment, a cache hierarchy is established to first check onboard memory 135 for a translation entry, then check the off board memory locations, and then query a distributed policy service if the translation entry is not located (see FIGS. 2, 3, 9, and corresponding text for further details).

Figure 2:
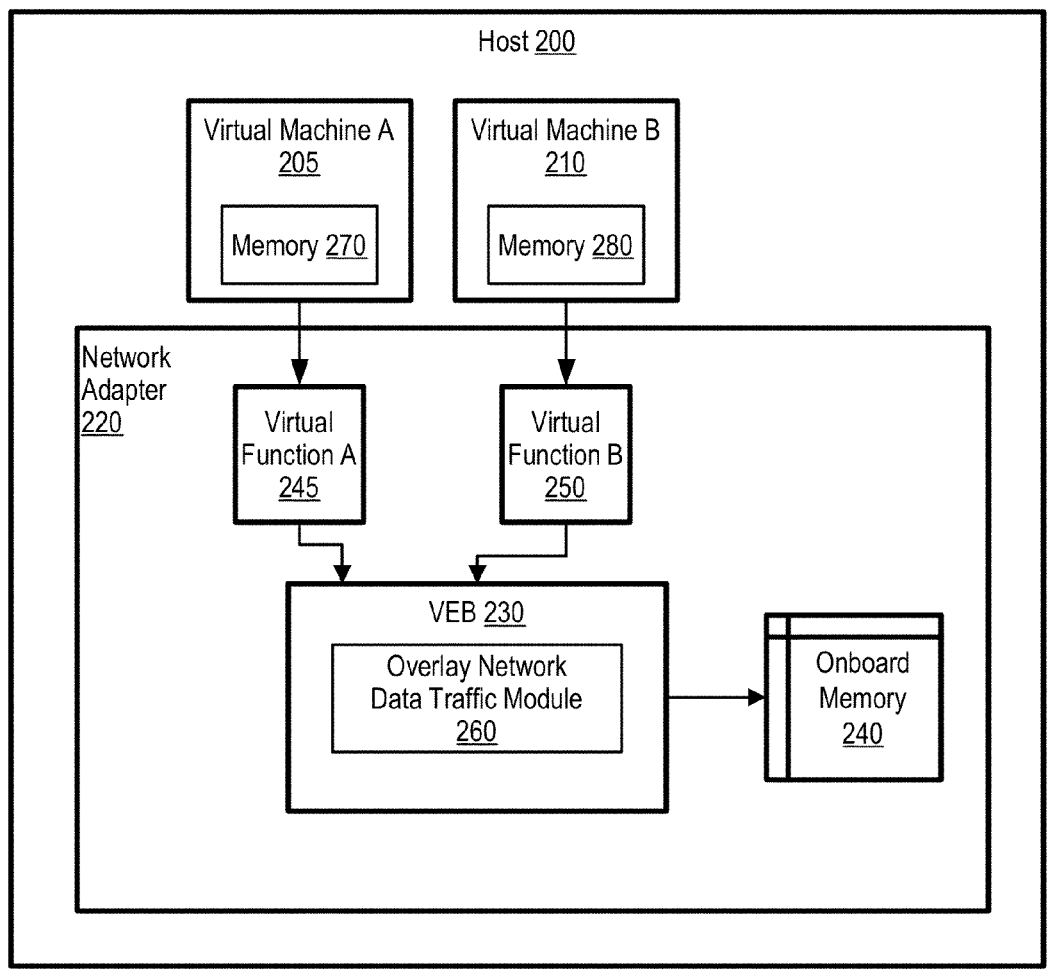
FIG. 2 is a diagram showing a virtual Ethernet bridge utilizing a cache hierarchy to store translation entries corresponding to virtual functions for egress data traversals.

FIG. 2 is a diagram showing a virtual Ethernet bridge utilizing a cache hierarchy to store translation entries corresponding to virtual functions for egress data traversals. The cache hierarchy mechanism de-couples translation table sizes from a network adapter's physical onboard memory by allocating off board memory space at the corresponding virtual machines (e.g., a second level cache).

Host 200 includes network adapter 220. Network adapter executes virtual Ethernet bridge 230, which utilizes separate memory partitions included in onboard memory 240 to store translation entries utilized by virtual functions 245 and 250. In one embodiment, virtual Ethernet bridge 230 combines dynamic memory partition resizing discussed herein with the caching hierarchy shown in FIG. 2. In another embodiment, virtual Ethernet bridge 230 may not utilize dynamic memory partition resizing when implementing the caching hierarchy shown in FIG. 2.

Figure 6:
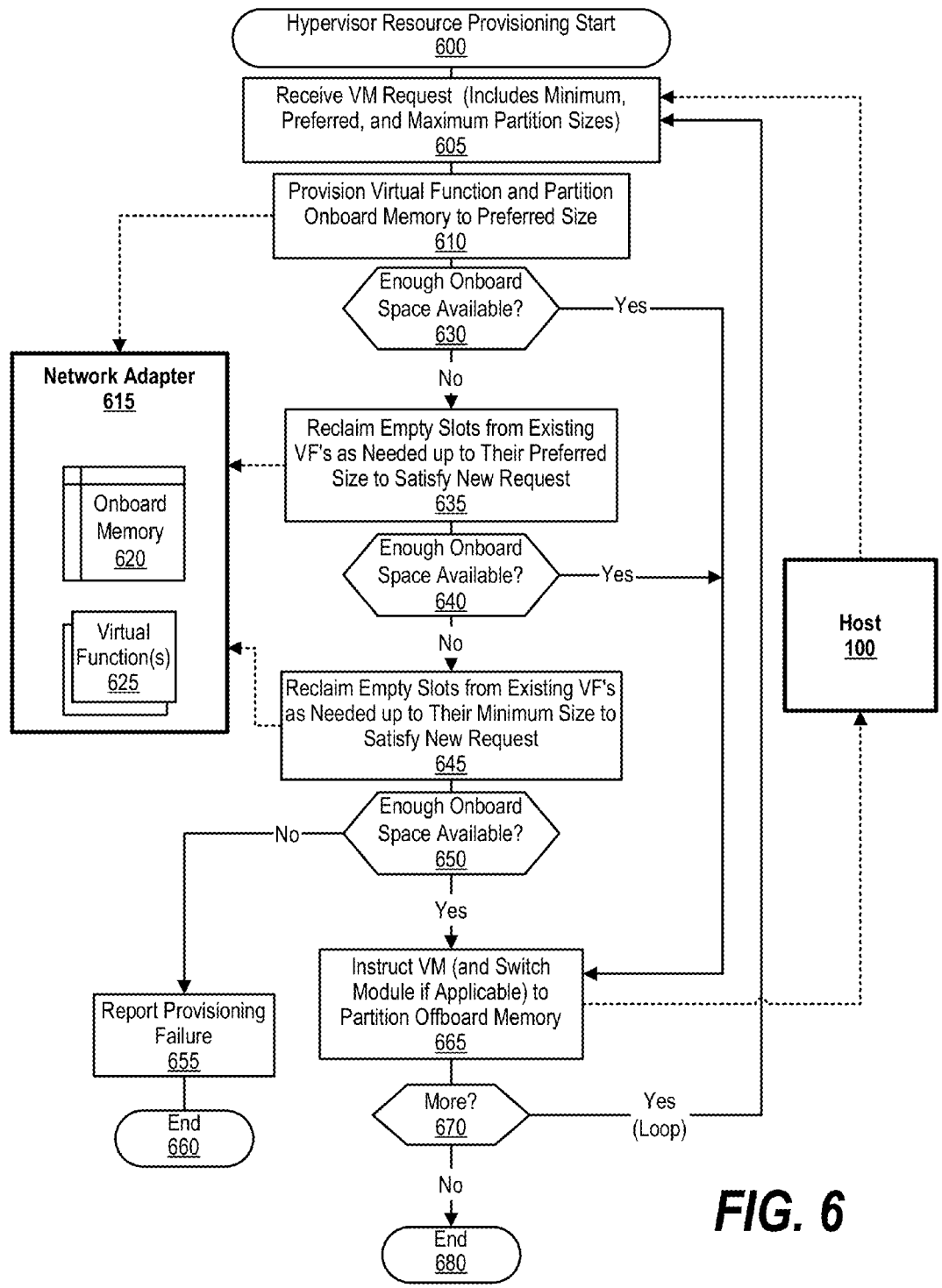
FIG. 6 is a flowchart showing steps taken in a hypervisor provisioning virtual functions and memory partitions for corresponding virtual machines.

When virtual functions 245 and 250 are provisioned by a hypervisor, the hypervisor may also instruct virtual machines 205 and 210 to allocate memories 270 and 280, respectively, as memory areas to store corresponding translation entries when their respective onboard memory partition is full (see FIG. 6 and corresponding text for further details).

As such, virtual Ethernet bridge 230 may store more translation entries on a local level (onboard and off board memory), which minimizes virtual Ethernet bridge 230 requesting a query to a remote distributed policy service to obtain a translation entry. In addition, the cache hierarchy allows for reduced network adapter memory requirements since virtual machine memory is used as a second level cache. This reduces network adapter cost and power consumption, as well as reduces the latency overhead of querying the network distributed policy server via the use of context backed adapter tables.

Figure 3:
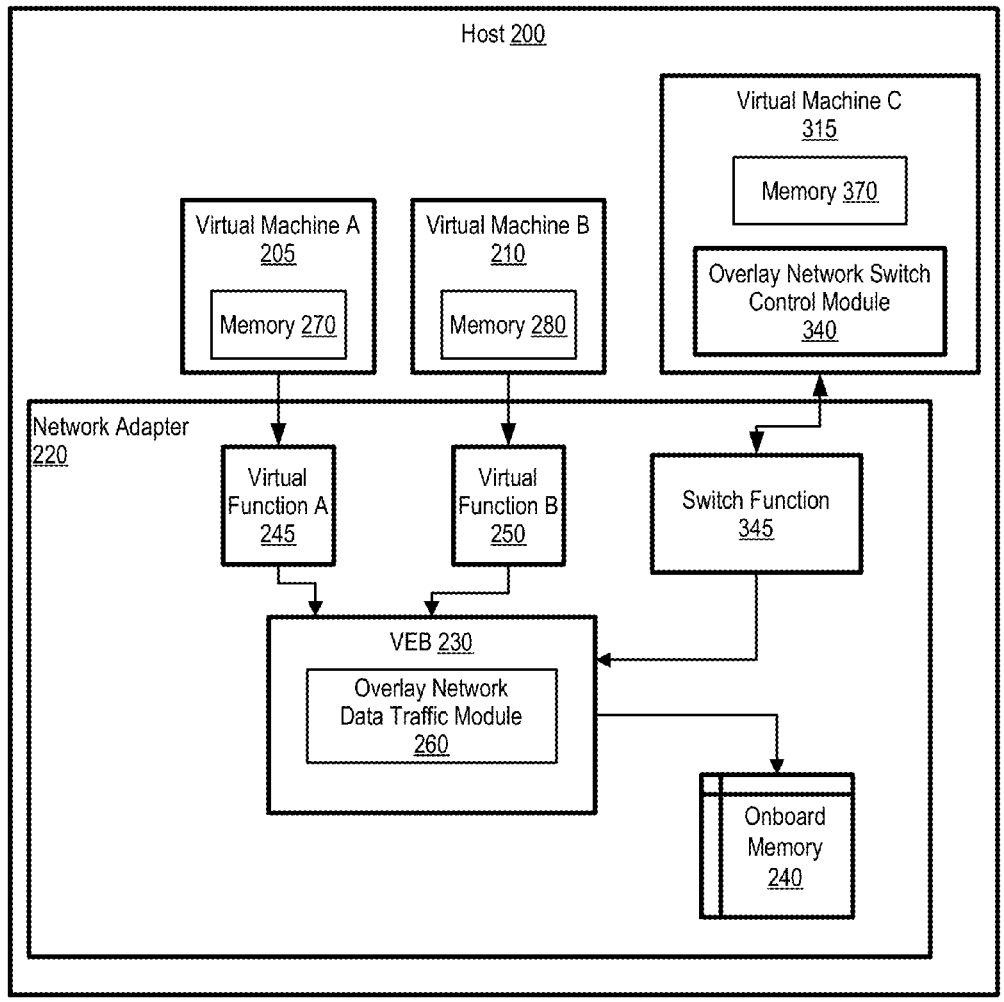
FIG. 3 is a diagram showing another embodiment of a cache hierarchy mechanism utilizing an overlay network switch control module.

FIG. 3 is a diagram showing another embodiment of a cache hierarchy mechanism utilizing an overlay network switch control module. FIG. 3 is similar to FIG. 2 with the exception of virtual machine 315, overlay network switch control module 340, memory 370, and switch function 345. Overlay network switch control module 340, in one embodiment, populates onboard memory 240 with translation entries for virtual machines 205 and 210. Switch function 345 may be a privileged virtual function that also allows overlay network switch control module 340 to provide physical port parameters to network adapter 320's physical port in order to control the physical port.

In one embodiment, overlay network switch control module 340 performs memory partitioning functions that are described herein as being performed by a hypervisor. In addition, overlay network switch control module 340 may allocate memory 370 on virtual machine 315 as another cache layer (level 3 cache), for use by virtual Ethernet bridge 230 to store/retrieve translation entries (see FIG. 11 and corresponding text for further details).

Figure 12:
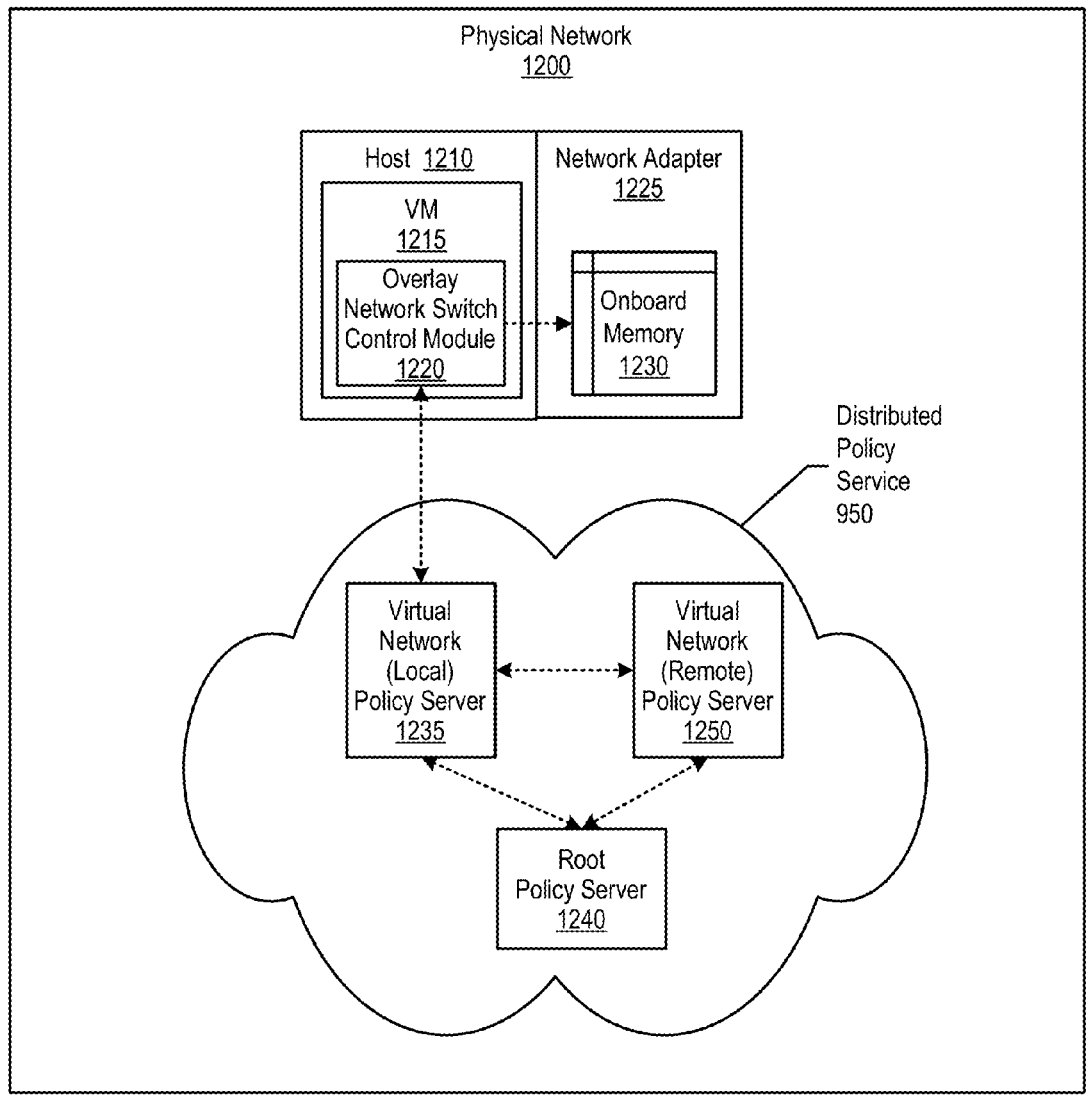
FIG. 12 is a diagram showing an overlay network switch control module querying a distributed policy service for physical path translations (translation entries) corresponding to a particular virtual machine.

In another embodiment, when virtual Ethernet bridge 230 is not able to locate a translation entry in onboard memory 240 or off board memory (either managed by the corresponding virtual machine or overlay network switch control module 340), overlay network switch control module 340 communicates with a distributed policy service to obtain translation entries that are not stored locally on host 200 or network adapter 220 (see FIG. 12 and corresponding text for further details).

Figure 4:
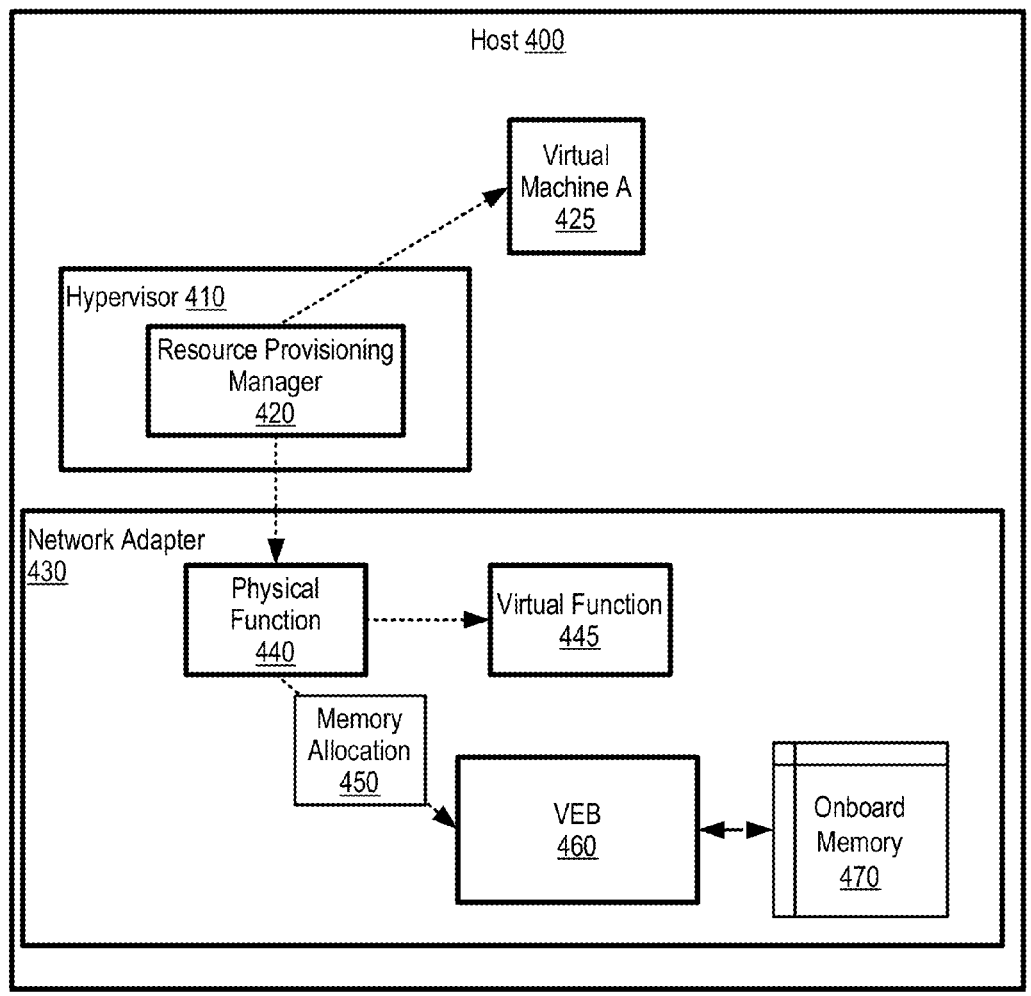
FIG. 4 is a diagram showing a hypervisor provisioning resources on a host system.

FIG. 4 is a diagram showing a hypervisor provisioning resources on a host system. Hypervisor 410 includes resource provisioning manager 420, which provisions resources within host 400, such as virtual machine 425, corresponding virtual function 445, and physical function 440. Physical function 440, in one embodiment, is a full feature PCIe adapter that allows hypervisor 410 to create other functions on network adapter 430, as well as manage virtual Ethernet bridge 460's operational state (e.g., managing errors and interrupts).

As discussed earlier, virtual function 445 is a limited feature PCIe adapter that allows virtual machine 425 to send/receive data packets directly to/from virtual Ethernet bridge 460, thus bypassing hypervisor 410.

In one embodiment, resource provisioning manager 420 sends memory allocation 450 to virtual Ethernet bridge 460 during provisioning, which includes a minimum, preferred, and maximum memory partition sizes. As such, virtual Ethernet bridge 460 configures a memory partition that corresponds to virtual function 445 in onboard memory 470 as discussed herein.

Figure 5:
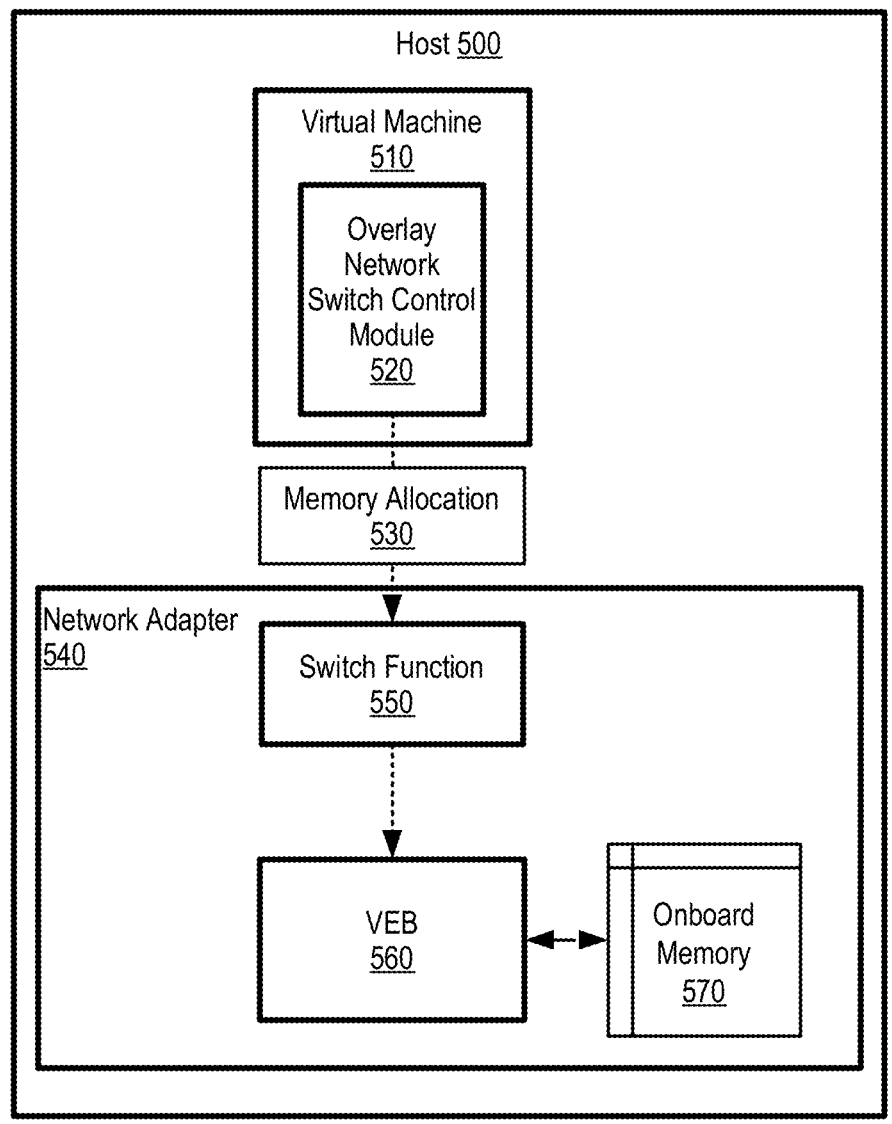
FIG. 5 is a diagram showing an overlay network switch control module providing memory allocation information to a network adapter through a switch function.

FIG. 5 is a diagram showing an overlay network switch control module providing memory allocation information to a network adapter through a switch function.

Virtual machine 510 executes on host 500 and includes overlay network switch control module 520, which utilizes switch function 550 to pass memory allocation 530 to virtual Ethernet bridge 560. In one embodiment, a hypervisor configures switch function 550 per SR-IOV guidelines and assigns a MAC address from a range of MAC address that are available to network adapter 540. This MAC address is also assigned to the requesting virtual machine (virtual machine 510). The switch function, in one embodiment, is a privileged virtual function that includes a port management field. The port management field enables the overlay network switch control module to send physical port parameters (e.g., MTU size, enable port mirroring, etc.) to network adapter 540, thus controlling the physical port. In addition, the port management field enables the overlay network switch control module to populate an overlay network database included in onboard memory 570 with translation entries (physical path translations) that correspond to overlay network policies.

FIG. 6 is a flowchart showing steps taken in a hypervisor provisioning virtual functions and memory partitions for corresponding virtual machines. Hypervisor processing commences at 600, whereupon the hypervisor receives a request from an administrator to join a virtual machine to an overlay network domain (step 605). As such, at step 610, the hypervisor creates one of virtual functions 625 on network adapter 615 to correspond with the virtual machine and provisions an onboard memory partition in onboard memory 620. In one embodiment, the hypervisor configures the virtual function per SR-IOV guidelines and assigns a MAC address from a range of MAC address that are available to network adapter 615. This same MAC address is assigned to the requesting virtual machine.

A determination is made as to whether there is enough onboard memory space to accommodate the partition request (decision 630). If there is enough memory space available, decision 630 branches to the "Yes" branch, whereupon the hypervisor instructs the virtual machine, if cache hierarchy is enabled, to partition off board memory to store translation entries. In one embodiment, the hypervisor may also instruct the switch control module to partition memory space for the virtual machine (see FIG. 3 and corresponding text for further details).

On the other hand, if enough onboard memory space is not available, decision 630 branches to the "No" branch, whereupon the hypervisor reclaims empty slots as needed that still provides existing virtual functions with their preferred memory partition size (step 635). For example, an existing virtual function may have a preferred memory partition size to store 200 translation entries and the existing virtual function's memory partition may be at a size to store 300 translation entries, 50 of which are not utilized. In this example, the hypervisor reclaims the 50 unused slots in order to dedicate them to the new virtual function.

A determination is made as to whether, after reclaiming particular memory slots, there is enough onboard memory space to accommodate the partition request (decision 640). If there is enough memory space available, decision 640 branches to the "Yes" branch, whereupon the hypervisor instructs the virtual machine, if applicable, to partition off board memory to store translation entries.

On the other hand, if enough onboard memory space is still not available after reclaiming some memory slots, decision 640 branches to the "No" branch, whereupon the hypervisor reclaims empty slots as needed that still provides existing virtual functions with their minimum memory partition size (step 645).

A determination is made as to whether, after reclaiming particular memory slots up to their minimum value, there is enough onboard memory space to accommodate the partition request (decision 650). If there is enough memory space available, decision 650 branches to the "Yes" branch, whereupon the hypervisor instructs the virtual machine, if applicable, to partition off board memory to store translation entries.

On the other hand, if enough onboard memory space is still not available after reclaiming more memory slots, decision 650 branches to the "No" branch, whereupon the hypervisor reports a provisioning failure at step 660, and ends at 660.

A determination is made as to whether there are more virtual machines requesting to join the overlay network domain (decision 670). If more virtual machines wish to join, decision 670 branches to the "Yes" branch, which loops back to instantiate and configure more virtual functions that correspond with the virtual machines. This looping continues until the hypervisor is through instantiating and configuring virtual functions for requesting virtual machines, at which point decision 670 branches to the "No" branch whereupon hypervisor resource provisioning ends at 680. As those skilled in the art can appreciate, the hypervisor may dynamically provision resources (adding resources and removing resources) during host 100's operation.

Figures 7A, 7B:
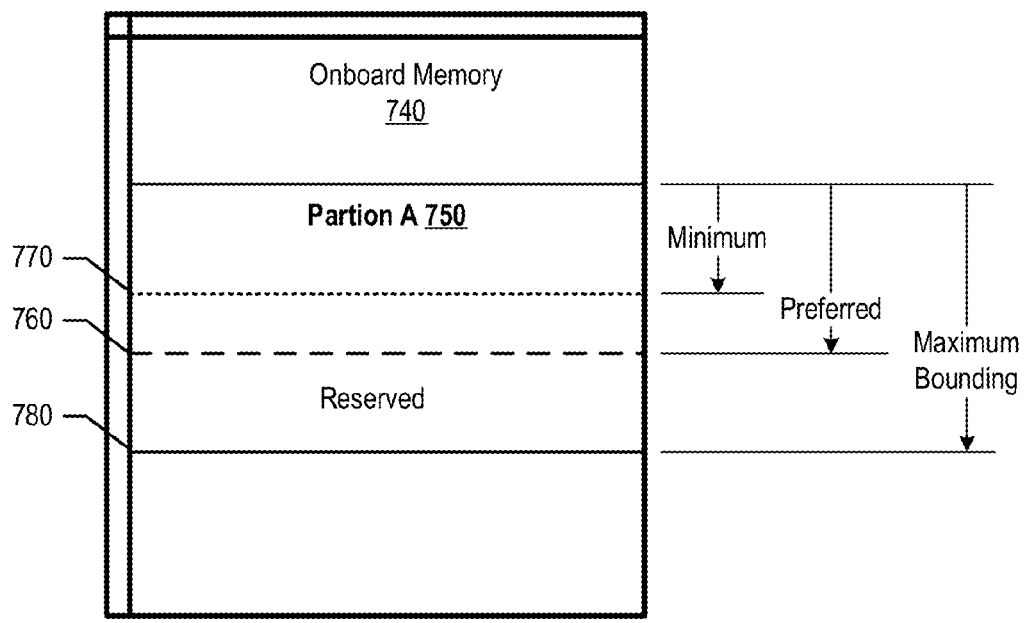
FIG. 7A is an exemplary diagram showing a translation entry that is stored in an onboard memory partition or an off board memory area.
FIG. 7B is an exemplary diagram showing an onboard memory partition that is dynamically resized between a minimum partition size and a maximum partition size bounding.

FIG. 7A is an exemplary diagram showing a translation entry that is stored in an onboard memory partition or an off board memory area. Translation entry 700 includes fields 705 through 735. Field 705 includes a source virtual machine IP address that corresponds to the virtual machine that initiates a data packet. Source overlay network identifier 710 includes an identifier of a virtual network to which the source virtual machine belongs. Field 715 includes a destination virtual machine IP address corresponding to the destination virtual machine of the data packet. Field 720 includes an identifier of a virtual network to which the destination virtual machine belongs, which may or may not be the same as the source overlay network identifier.

Fields 725 and 730 include physical address information pertaining to the host system (server) that executes the destination virtual machine. Field 735 includes the destination server's MAC address, and field 730 includes the destination server's IP address. In one embodiment, translation entry 700 includes other information relating to routing the data packet through other appliances, such as a firewall.

FIG. 7B is an exemplary diagram showing an onboard memory partition that is dynamically resized between a minimum partition size and a maximum partition size. Onboard memory 740 includes partition 750. A virtual Ethernet translation entry bridge, at initial configuration, may allocate a preferred partition size (760) to partition 750. As the virtual Ethernet bridge stores/removes translation entries for the corresponding virtual function during operation, the virtual Ethernet bridge may dynamically resize partition 750 up to a maximum bounding partition size (780) or a minimum partition size (770).

The example in FIG. 7B shows a contiguous memory partitioning mechanism. As those skilled in the art can appreciate, onboard memory 740 may be partition non-contiguously such that memory areas for a particular virtual function are interlaced between memory areas for other virtual functions.

Figure 8:
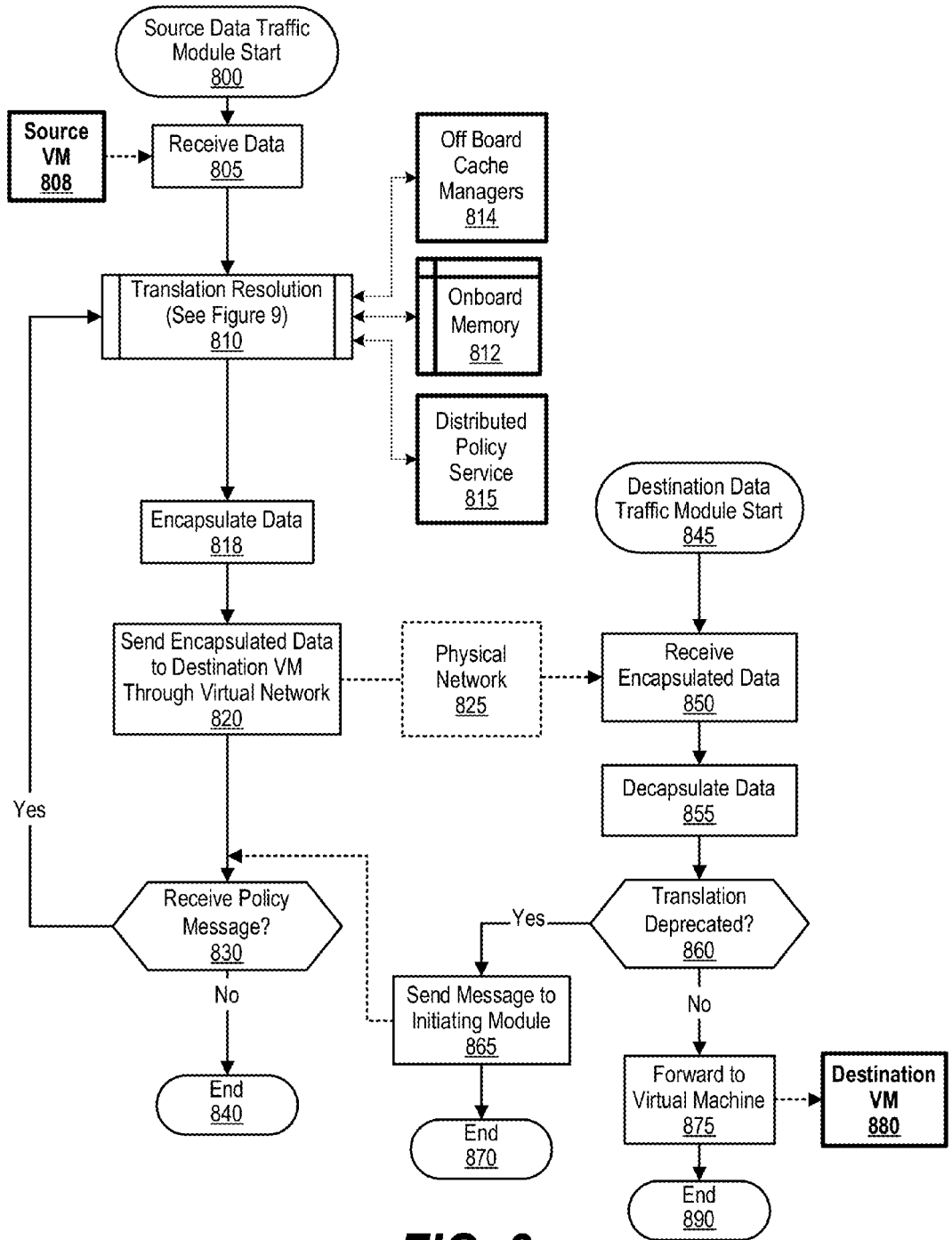
FIG. 8 is a flowchart showing steps taken in an overlay network data traffic module (source data traffic module) locating a translation entry that is utilized to send a data packet to a destination virtual machine.

FIG. 8 is a flowchart showing steps taken in an overlay network data traffic module (source data traffic module) locating a translation entry that is utilized to send a data packet to a destination virtual machine.

Source data traffic module processing commences at 800, whereupon the source data traffic module receives a data packet at a virtual function sent from source virtual machine 808 (step 805). The source data traffic module locates a translation entry, in a memory partition corresponding to the virtual function, that is associated with source virtual machine 808 and destination virtual machine 880. The location process includes accessing onboard memory 812 and may include querying off board cache managers 814 and/or querying distributed policy service 815 (pre-defined process block 810, see FIG. 9 and corresponding text for further details).

Next, the source data traffic module encapsulates the data packet using the translation entry at step 818, and sends the encapsulated data packet over one or more virtual networks that are overlayed on physical network 825 (step 820).

Destination data traffic module processing commences at 845, whereupon the destination data traffic module receives the encapsulated data packet at step 850. At step 855, the destination data traffic module decapsulates the data packet, and determines whether the source data traffic module used a most recent translation entry (decision 860). For example, the source data traffic module may have utilized an outdated translation entry that directs the data packet to the wrong host device (see FIG. 7A and corresponding text for further details).

If the data packet was encapsulated with an outdated data packet, decision 860 branches to the "Yes" branch, whereupon the destination data traffic module sends a message to the source data traffic module (step 865) indicating the depreciated translation entry, and ends at 870.

At the source data traffic module, the source data traffic module determines that the destination data traffic module sent the message (decision 830), and branches to the "Yes" branch to acquire an updated translation entry, such as from distributed policy service. On the other hand, if the source data traffic module does not receive a message, decision 830 branches to the "No" branch whereupon source data traffic module processing ends at 840.

Referring back to the destination data traffic module, if the data was encapsulated with the correct translation entry, decision 860 branches to the "Yes" branch whereupon the destination data traffic module forwards the decapsulated data packet to destination virtual machine 880 at step 875, and processing ends at 890.

Figure 9:
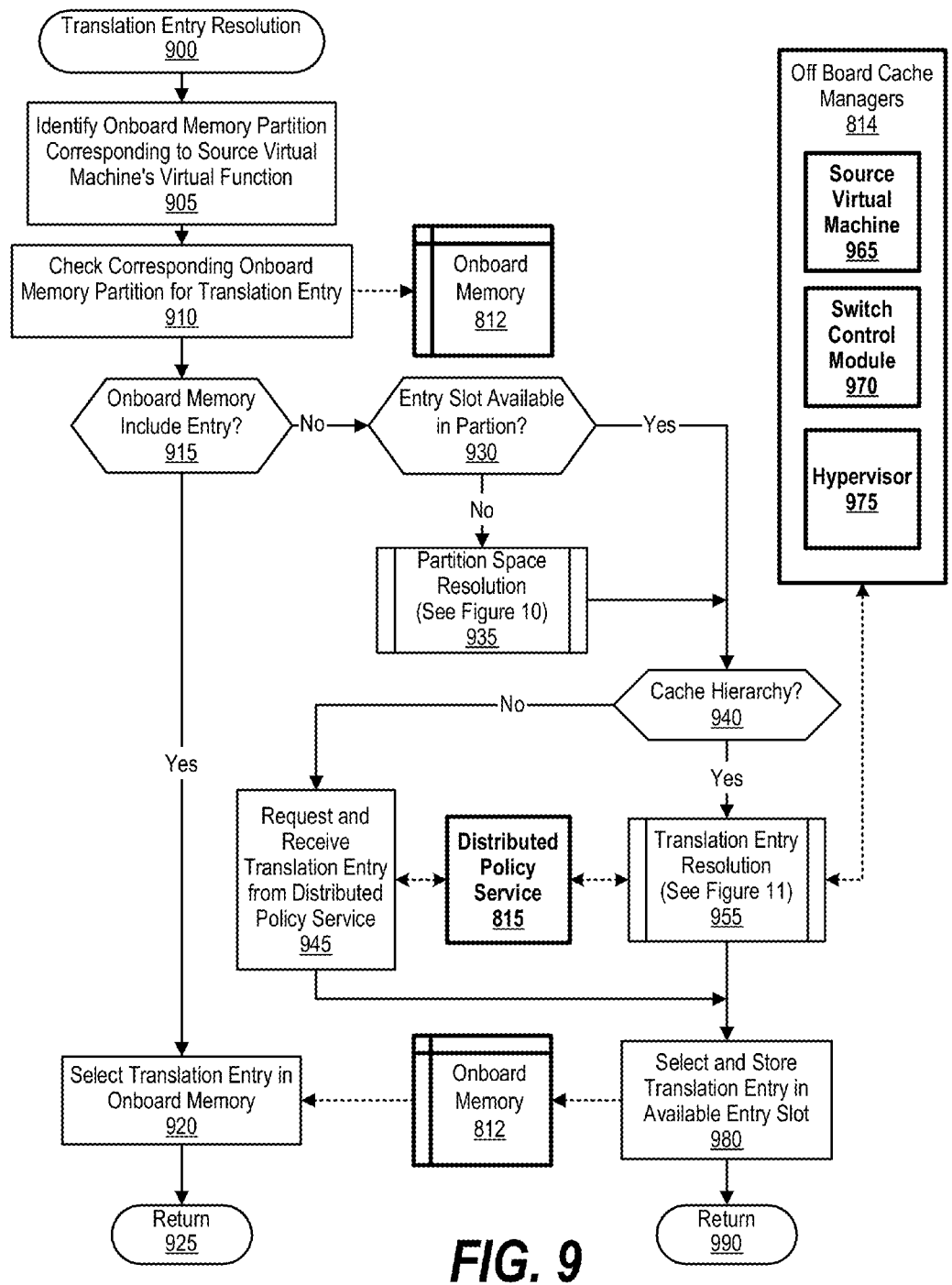
FIG. 9 is flowchart showing steps taken in a data traffic module locating a translation entry that correspond to a data packet sent from a source virtual machine with a destination at a destination virtual machine.

FIG. 9 is flowchart showing steps taken in a data traffic module locating a translation entry that correspond to a data packet sent from a source virtual machine with a destination at a destination virtual machine. Processing commences at 900, whereupon the data traffic module identifies a memory partition in onboard memory 812 for a virtual function corresponding to the source virtual machine.

At step 910, the data traffic module checks onboard memory 812 for the translation entry. Onboard memory 812 is a memory area on the network adapter and includes a memory partition for each virtual function that executes on the network adapter. A determination is made as to whether onboard memory 812 includes the translation entry (decision 915). If onboard memory 812 includes a translation entry, decision 915 branches to the "Yes" branch whereupon the data traffic module selects the translation entry at step 920, and returns at 925.

On the other hand, if onboard memory 812 does not include the translation entry, decision 915 branches to the "No" branch whereupon a determination is made as to whether there is an entry slot available in the virtual function's corresponding memory partition located in onboard memory 812 (in preparation of locating and storing the translation entry in onboard memory 812). If the virtual function's memory partition does not include an available slot, decision 930 branches to the "No" branch whereupon the data traffic module (or a corresponding virtual Ethernet bridge) proceeds through a series of partition space resolution steps to add one or more available slots to the memory partition (pre-defined process block 935, see FIG. 10 and corresponding text for further details).

On the other hand, if a slot is available, decision 930 branches to the "Yes" branch whereupon a determination is made as to whether a cache hierarchy is enabled (decision 940). For example, a virtual function may utilize onboard memory as well as off board memory to store translation entries (e.g., host memory space). If cache hierarch is not enabled, decision 940 branches to the "No" branch whereupon the data traffic module (e.g., through a switch control module) requests and receives the translation entry from distributed policy service 815 at step 945. Distributed policy service 815 may be, for example, a server-based system that manages policies for sending and receiving data packets over an overlay network that comprises one or more virtual networks (see FIGS. 12-13 and corresponding text for further details).

On the other hand, if cache hierarchy is enabled, decision 940 branches to the "Yes" branch, whereupon the data traffic module queries one or more off board cache managers 814 to locate the translation entry. In one embodiment, the data traffic module utilizes a virtual function to opaquely retrieve the translation entry in memory allocated on the corresponding virtual machine (e.g., a DMA read operation), thus no active participation by the virtual machine is required. If the data traffic module does not locate the translation entry at one of off board cache managers 814, the data traffic module may query distributed policy service 815 (pre-defined process block 955, see FIG. 11 and corresponding text for further details).

At step 980, the data traffic module selects and stores the translation entry in an available slot included in the virtual function's corresponding memory partition (located in onboard memory 812), and returns at 990.

Figure 10:
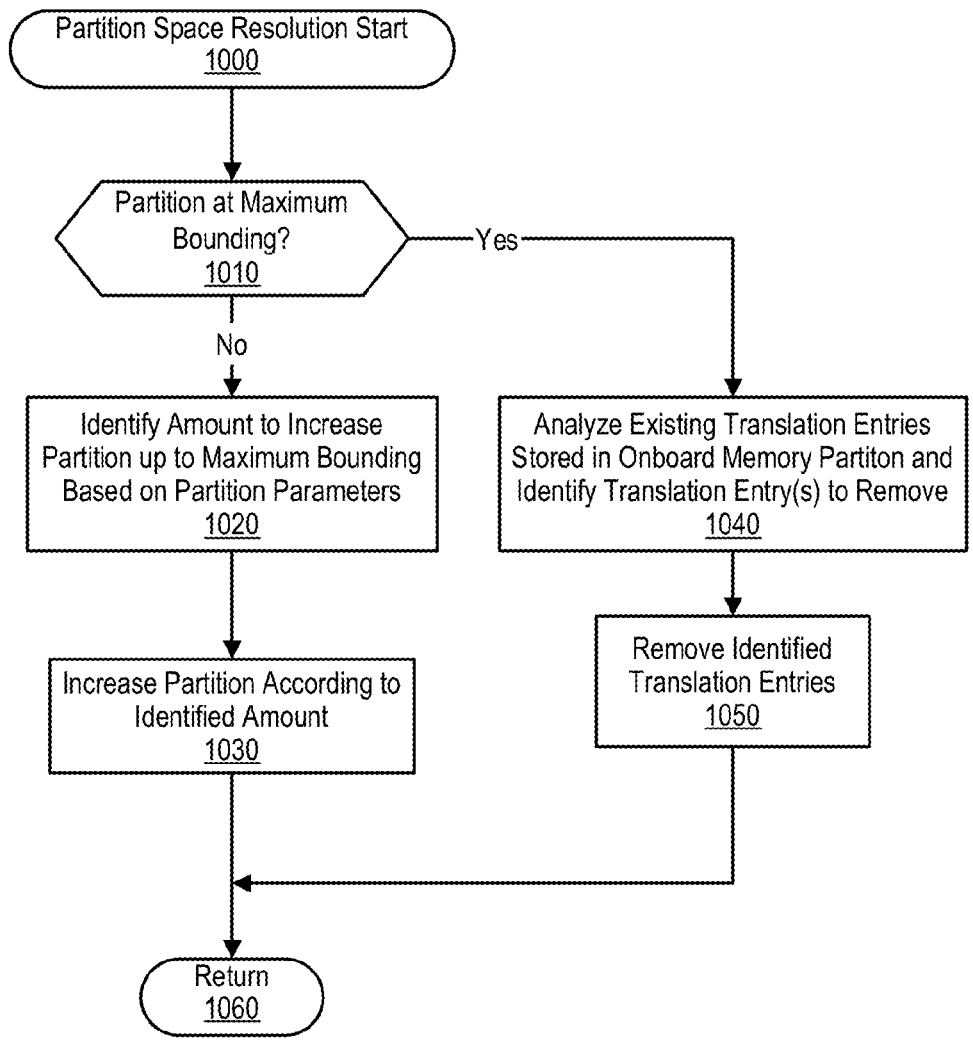
FIG. 10 is flowchart showing steps in a virtual function's corresponding memory partition size in order to store more translation entries for the virtual function.

FIG. 10 is flowchart showing steps in a virtual function's corresponding memory partition size in order to store more translation entries for the virtual function. Processing commences at 1000, whereupon a determination is made as to whether the memory partition is at a maximum partition size bounding (decision 1010). If the partition is not at the maximum bounding, decision 1010 branches to the "No" branch whereupon processing identifies an amount to increase the memory partition up to the maximum bounding based on one or more partition parameters. As discussed herein, processing may use a scatter approach to increase the memory partition in non-contiguous sections, or use a contiguous approach as shown in FIG. 7B. Processing returns at 1060.

On the other hand, if the memory partition is at a maximum bounding, decision 1010 branches to the "Yes" branch whereupon processing analyzes the existing translations stored in the memory partition and identifies one or more translation entries to remove (e.g., by using a least recently used (LRU) algorithm) (step 1040). Processing returns at 1060.

Figure 11:
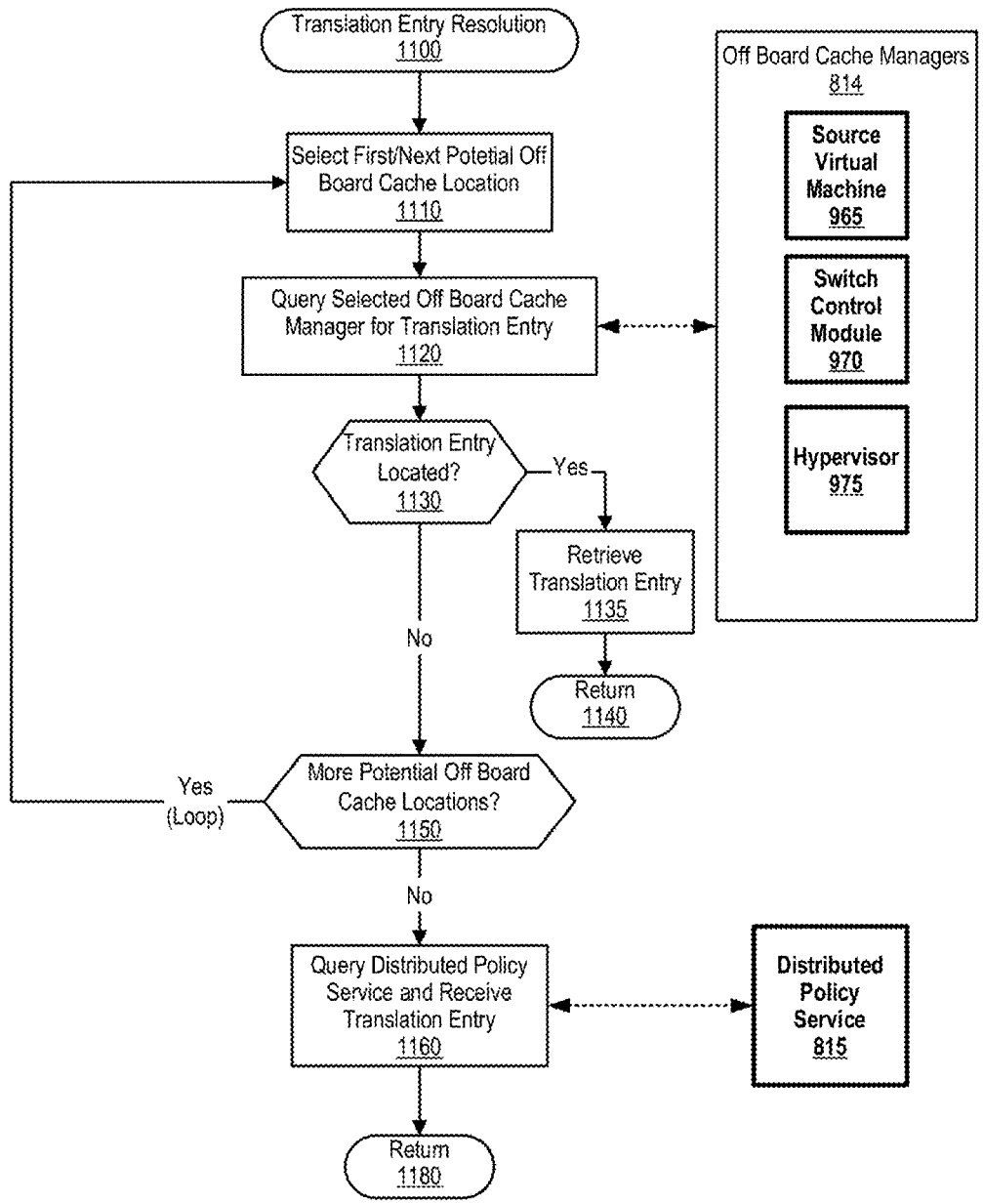
FIG. 11 is a flowchart showing steps taken in resolving a translation entry.

FIG. 11 is a flowchart showing steps taken in resolving a translation entry. Processing commences at 1100, whereupon processing selects a first potential off board memory location at step 1100. For example, a cache hierarchy may be configured such that, after a data traffic module checks an onboard memory area, the data traffic module then checks a virtual machine's memory area, and then checks a switch function's memory area. In addition, a hypervisor may allocate memory to the virtual function, which may be incorporated into the memory hierarchy.

At step 1120, processing queries the selected off board cache manager, such as one of off board cache managers 814 (source virtual machine 965, switch control module 970, or hypervisor 975). In one embodiment, the data traffic module searches for the translation entry in off board memory. In another embodiment, the data traffic module utilizes a virtual function to opaquely search for the translation entry in memory allocated on the corresponding virtual machine (e.g., DMA read), thus no active participation by the virtual machine is required. A determination is made as to whether the translation entry was located (decision 1130). If the translation entry was located, decision 1130 branches to the "Yes" branch whereupon processing retrieves the translation entry at step 1135 and returns at 1140.

On the other hand, of the translation entry was not located, decision 1130 branches to the "No" branch whereupon a determination is made as to whether there are more off board cache locations in the cache hierarchy to query (decision 1150). If there are more off board cache locations to query, decision 1150 branches to the "Yes" branch to select and query a different cache manager. This looping continues until there are no more off board cache managers to query, at which point decision 1150 branches to the "No" branch whereupon processing queries distributed policy service 815 and receives the translation entry at step 1160. Processing returns at 1180.

FIG. 12 is a diagram showing an overlay network switch control module querying a distributed policy service for physical path translations (translation entries) corresponding to a particular virtual machine. Host 1210 resides on physical network 1200 and includes overlay network switch control module 1220 that executes on virtual machine 1215.

Overlay network switch control module 1220 queries virtual network policy server 1235, which is a local policy server that manages policies and physical path translations pertaining to virtual machine 1215's virtual network. In one embodiment, policy servers for different virtual networks are co-located and differentiate policy requests from different switch control modules according to their corresponding overlay network identifier.

Distributed policy service 950 is structured hierarchally and, when virtual network policy server 1235 does not include a corresponding physical path translation, virtual network policy server 1235 queries root policy server 1240 for the policy or physical path translation. In turn, root policy server 1240 may send either the physical path translation to virtual network policy server 1235 or an indication as to another server to query for the physical path translation (e.g., virtual network policy server 1250's ID). If the later occurs, virtual network policy server 1230 queries virtual network policy server 1250 for the physical path translation.

Once virtual network policy server 1235 acquires the physical path translation, virtual network policy server 1235 sends the physical path translation to overlay network switch control module 1220, which it stores in onboard memory 1230 located on network adapter 1225 for use by a data traffic module to encapsulate data packets.

Figure 13:
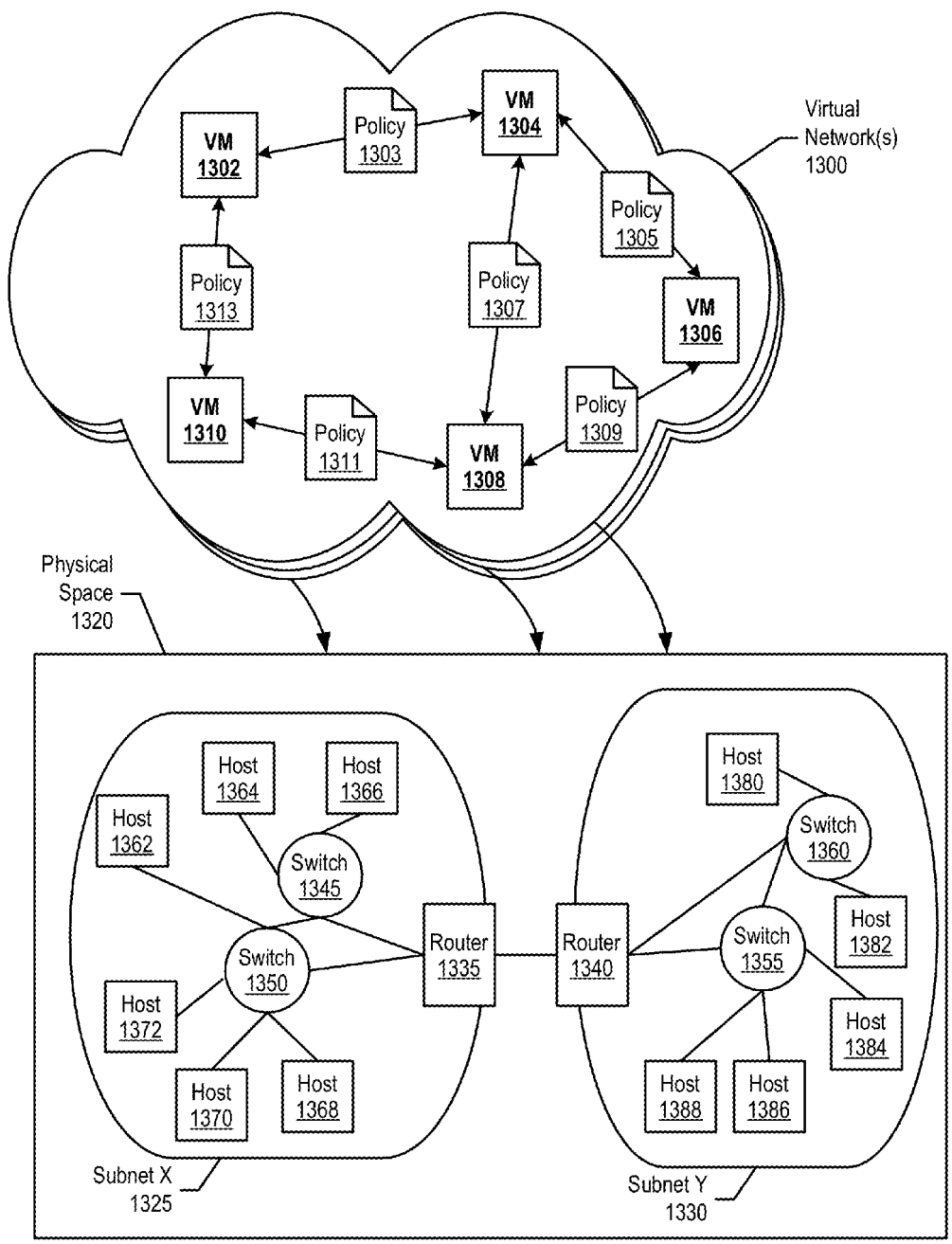
FIG. 13 is a diagram showing virtual network abstractions that are overlayed onto a physical network space.

FIG. 13 is a diagram showing virtual network abstractions that are overlayed onto a physical network space. Virtual networks 1300 include policies (e.g., policies 1303-1313) that provide an end-to-end virtual connectivity between virtual machines (e.g., virtual machines 1302-1310). Each of virtual networks 100 corresponds to a unique virtual identifier, which allows concurrent operation of multiple virtual networks over physical space 1320. As those skilled in the art can appreciate, some of virtual networks 1300 may include a portion of virtual machines 1302-1310, while other virtual networks 1300 may include different virtual machines and different policies than what is shown in FIG. 13.

When a "source" virtual machine sends data to a "destination" virtual machine, a policy corresponding to the two virtual machines describes a logical path on which the data travels (e.g., through a firewall, through an accelerator, etc.). In other words, policies 1303-1313 define how different virtual machines communicate with each other (or with external networks). For example, a policy may define quality of service (QoS) requirements between a set of virtual machines; access controls associated with particular virtual machines; or a set of virtual or physical appliances (equipment) to traverse when sending or receiving data. In addition, some appliances may include accelerators such as compression, IP Security (IPSec), SSL, or security appliances such as a firewall or an intrusion detection system. In addition, a policy may be configured to disallow communication between the source virtual machine and the destination virtual machine.

Virtual networks 1300 are logically overlayed onto physical space 1320, which includes physical entities 1335 through 1388 (hosts, switches, and routers). While the way in which a policy is enforced in the system affects and depends on physical space 1320, virtual networks 1300 are more dependent upon logical descriptions in the policies. As such, multiple virtual networks 1300 may be overlayed onto physical space 1320. As can be seen, physical space 1320 is divided into subnet X 1325 and subnet Y 1330. The subnets are joined via routers 1335 and 1340. Virtual networks 1300 are independent of physical constraints of physical space 1320 (e.g., L2 layer constraints within a subnet). Therefore, a virtual network may include physical entities included in both subnet X 1325 and subnet Y 1330.

In one embodiment, the virtual network abstractions support address independence between different virtual networks 1300. For example, two different virtual machines operating in two different virtual networks may have the same IP address. As another example, the virtual network abstractions support deploying virtual machines, which belong to the same virtual networks, onto different hosts that are located in different physical subnets (includes switches and/or routers between the physical entities). In another embodiment, virtual machines belonging to different virtual networks may be hosted on the same physical host. In yet another embodiment, the virtual network abstractions support virtual machine migration anywhere in a data center without changing the virtual machine's network address and losing its network connection.

For further details regarding this architecture, see "Virtual Switch Data Control in a Distributed Overlay Network," Ser. No. 13/204,211, filed Aug. 5, 2011, which is incorporated herein by reference.

Figure 14:
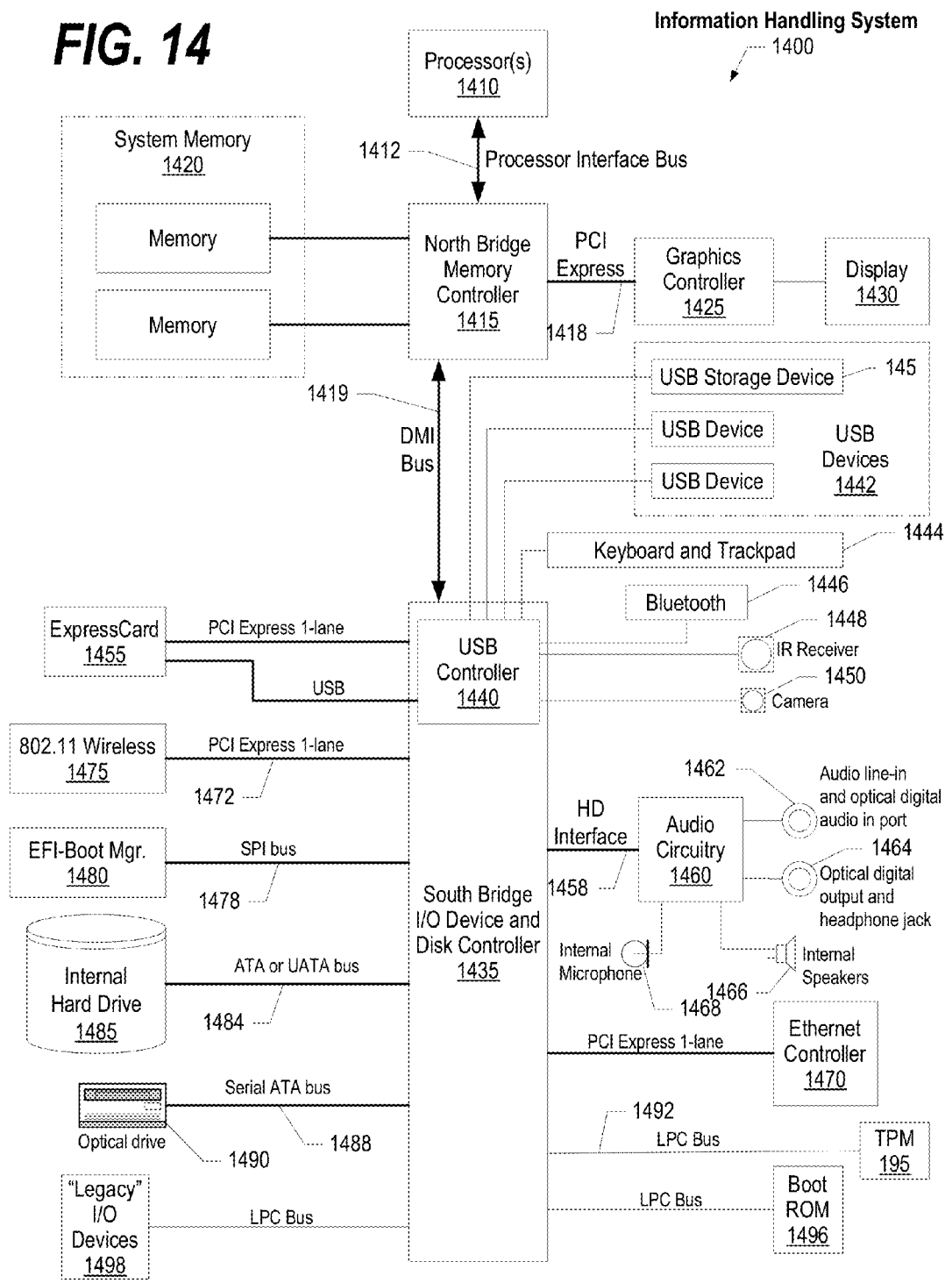
FIG. 14 is a block diagram of a data processing system in which the methods described herein can be implemented.

FIG. 14 illustrates information handling system 1400, which is a simplified example of a computer system capable of performing the computing operations described herein. Information handling system 1400 includes one or more processors 1410 coupled to processor interface bus 1412. Processor interface bus 1412 connects processors 1410 to Northbridge 1415, which is also known as the Memory Controller Hub (MCH). Northbridge 1415 connects to system memory 1420 and provides a means for processor(s) 1410 to access the system memory. Graphics controller 1425 also connects to Northbridge 1415. In one embodiment, PCI Express bus 1418 connects Northbridge 1415 to graphics controller 1425. Graphics controller 1425 connects to display device 1430, such as a computer monitor.

Northbridge 1415 and Southbridge 1435 connect to each other using bus 1419. In one embodiment, the bus is a Direct Media Interface (DMI) bus that transfers data at high speeds in each direction between Northbridge 1415 and Southbridge 1435. In another embodiment, a Peripheral Component Interconnect (PCI) bus connects the Northbridge and the Southbridge. Southbridge 1435, also known as the I/O Controller Hub (ICH) is a chip that generally implements capabilities that operate at slower speeds than the capabilities provided by the Northbridge. Southbridge 1435 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1496 and "legacy" I/O devices (using a "super I/O" chip). The "legacy" I/O devices (1498) can include, for example, serial and parallel ports, keyboard, mouse, and/or a floppy disk controller. The LPC bus also connects Southbridge 1435 to Trusted Platform Module (TPM) 1495. Other components often included in Southbridge 1435 include a Direct Memory Access (DMA) controller, a Programmable Interrupt Controller (PIC), and a storage device controller, which connects Southbridge 1435 to nonvolatile storage device 1485, such as a hard disk drive, using bus 1484.

ExpressCard 1455 is a slot that connects hot-pluggable devices to the information handling system. ExpressCard 1455 supports both PCI Express and USB connectivity as it connects to Southbridge 1435 using both the Universal Serial Bus (USB) the PCI Express bus. Southbridge 1435 includes USB Controller 1440 that provides USB connectivity to devices that connect to the USB. These devices include webcam (camera) 1450, infrared (IR) receiver 1448, keyboard and trackpad 1444, and Bluetooth device 1446, which provides for wireless personal area networks (PANs). USB Controller 1440 also provides USB connectivity to other miscellaneous USB connected devices 1442, such as a mouse, removable nonvolatile storage device 1445, modems, network cards, ISDN connectors, fax, printers, USB hubs, and many other types of USB connected devices. While removable nonvolatile storage device 1445 is shown as a USB-connected device, removable nonvolatile storage device 1445 could be connected using a different interface, such as a Firewire interface, etcetera.

Wireless Local Area Network (LAN) device 1475 connects to Southbridge 1435 via the PCI or PCI Express bus 1472. LAN device 1475 typically implements one of the IEEE 802.11 standards of over-the-air modulation techniques that all use the same protocol to wireless communicate between information handling system 1400 and another computer system or device. Optical storage device 1490 connects to Southbridge 1435 using Serial ATA (SATA) bus 1488. Serial ATA adapters and devices communicate over a high-speed serial link. The Serial ATA bus also connects Southbridge 1435 to other forms of storage devices, such as hard disk drives. Audio circuitry 1460, such as a sound card, connects to Southbridge 1435 via bus 1458. Audio circuitry 1460 also provides functionality such as audio line-in and optical digital audio in port 1462, optical digital output and headphone jack 1464, internal speakers 1466, and internal microphone 1468. Ethernet controller 1470 connects to Southbridge 1435 using a bus, such as the PCI or PCI Express bus. Ethernet controller 1470 connects information handling system 1400 to a computer network, such as a Local Area Network (LAN), the Internet, and other public and private computer networks.

While FIG. 14 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 1495) shown in FIG. 14 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 15.

Figure 15:
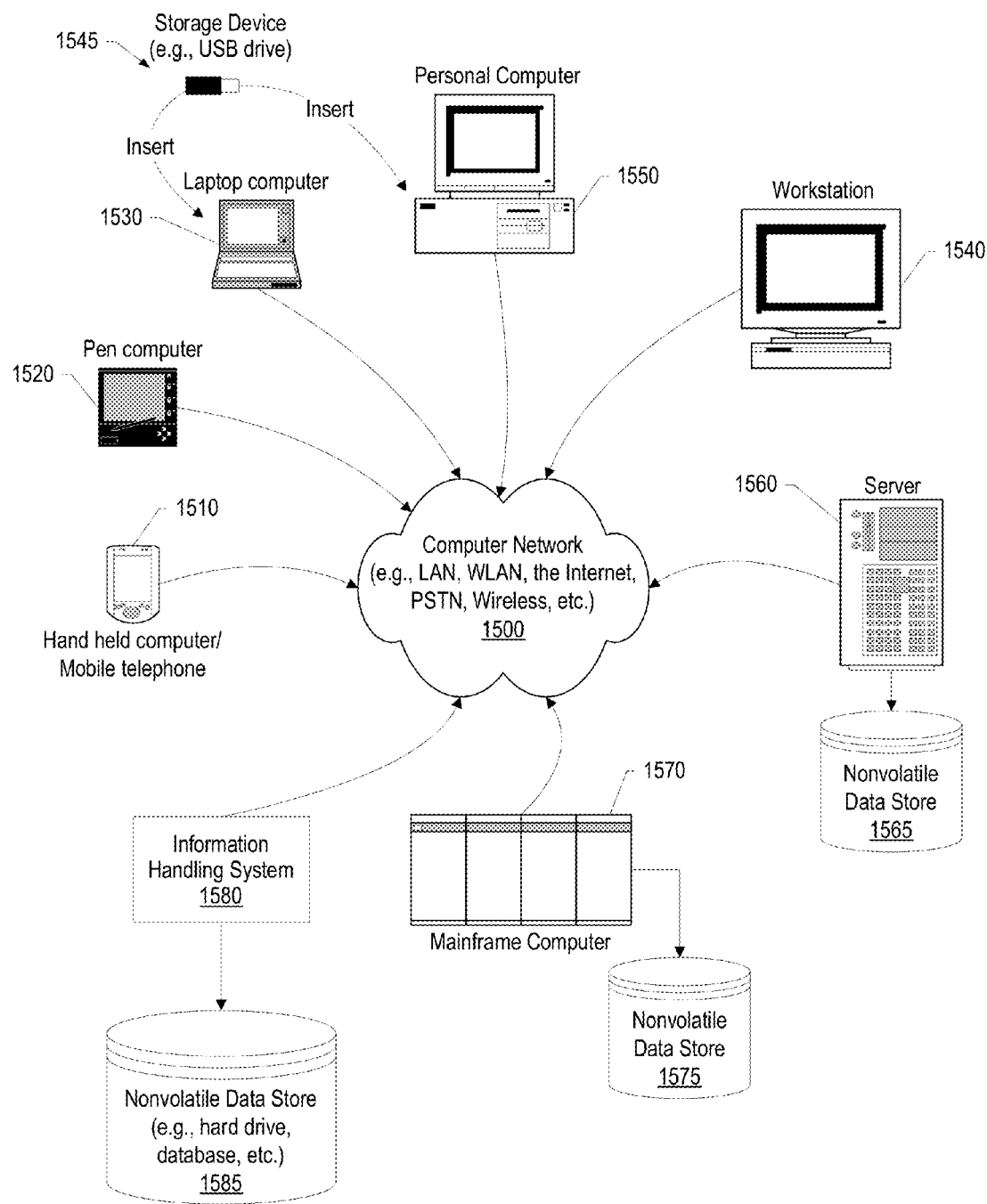
FIG. 15 provides an extension of the information handling system environment shown in FIG. 14 to illustrate that the methods described herein can be performed on a wide variety of information handling systems which operate in a networked environment.

FIG. 15 provides an extension of the information handling system environment shown in FIG. 14 to illustrate that the methods described herein can be performed on a wide variety of information handling systems that operate in a networked environment. Types of information handling systems range from small handheld devices, such as handheld computer/mobile telephone 1510 to large mainframe systems, such as mainframe computer 1570. Examples of handheld computer 1510 include personal digital assistants (PDAs), personal entertainment devices, such as MP3 players, portable televisions, and compact disc players. Other examples of information handling systems include pen, or tablet, computer 1520, laptop, or notebook, computer 1530, workstation 1540, personal computer system 1550, and server 1560. Other types of information handling systems that are not individually shown in FIG. 15 are represented by information handling system 1580. As shown, the various information handling systems can be networked together using computer network 1500. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 15 depicts separate nonvolatile data stores (server 1560 utilizes nonvolatile data store 1565, mainframe computer 1570 utilizes nonvolatile data store 1575, and information handling system 1580 utilizes nonvolatile data store 1585). The nonvolatile data store can be a component that is external to the various information handling systems or can be internal to one of the information handling systems. In addition, removable nonvolatile storage device 1445 can be shared among two or more information handling systems using various techniques, such as connecting the removable nonvolatile storage device 1445 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:
1. An information handling system comprising:
one or more processors;
a memory coupled to at least one of the one or more processors;
a set of computer program instructions stored in the memory and executed by at least one of the one or more processors in order to perform actions of:
  allocating a memory partition in a memory area located on a network adapter, wherein the memory partition corresponds to a first virtual function executing on the network adapter;
  storing one or more physical path translation entries in the memory partition, wherein each of the one or more physical bath translations include a physical address of a destination host, and wherein a selected one of the physical addresses is appended to one or more data packets traversing through the first virtual function and targeted to a destination virtual machine executing on a corresponding one of the destination hosts; and
  dynamically resizing the memory partition based upon an amount of the one or more physical path translations stored in the memory partition.

2. The information handling system of claim 1 wherein the one or more processors perform additional actions comprising:
  receiving a maximum partition size bounding that corresponds to the first virtual function, wherein the memory partition is dynamically resized up to the maximum partition size bounding.

3. The information handling system of claim 1 wherein the one or more processors perform additional actions comprising:
  identifying a different memory partition in the memory area that corresponds to a different virtual function;
  determining that the different memory partition includes one or more available memory slots; and
  allocating, during the dynamically resizing, one or more of the available memory slots to the memory partition corresponding to the first virtual function.

4. The information handling system of claim 3 wherein the memory partition and the allocated memory slots are non-contiguous.

5. The information handling system of claim 1 wherein the one or more processors perform additional actions comprising:
  identifying a source virtual machine and a different destination virtual machine that correspond to a selected one of the one or more data packets;
  determining that none of the one or more physical path translation entries stored in the memory partition correspond to both the source virtual machine and the different destination virtual machine;
  sending a translation request to a distributed policy service for a new physical path translation entry, the translation request identifying the source virtual machine and the different destination virtual machine;
  receiving the new physical path translation entry from the distributed policy service; and
  storing the new physical path translation entry in the memory partition.

6. The information handling system of claim 5 wherein the selected data packet is sent from the source virtual machine to the different destination virtual machine using the new physical path translation entry over one or more virtual networks, wherein each of the one or more virtual networks is independent of physical topology constraints of a physical network.

7. The information handling system of claim 6 wherein:
  the new physical path translation entry includes a source overlay network identifier and a destination overlay network identifier;
  the source overlay network identifier identifies a first virtual network that corresponds to the source virtual machine, the first virtual network included in the one or more virtual networks;
  the destination overlay network identifier identifies a second virtual network that corresponding to the destination virtual machine, the second virtual network included in the one or more virtual networks; and
  the first virtual network is different than the second virtual network.

8. The information handling system of claim 1 wherein an overlay network switch control module performs the dynamically resizing of the memory partition, the overlay network switch control module executing on a virtual machine and utilizing a switch function executing on the network adapter to dynamically resize the memory partition.

9. A computer program product stored in a computer readable storage medium, comprising computer program code that, when executed by an information handling system, causes the information handling system to perform actions comprising:

allocating a memory partition in a memory area located on a network adapter, wherein the memory partition corresponds to a first virtual function executing on the network adapter;

storing one or more physical path translation entries in the memory partition, wherein each of the one or more physical path translations include a physical address of a destination host, and wherein a selected one of the physical addresses is appended to one or more data packets traversing through the first virtual function and targeted to a destination virtual machine executing on a corresponding one of the destination hosts; and dynamically resizing the memory partition based upon an amount of the one or more physical path translations stored in the memory partition.

10. The computer program product of claim 9 wherein the information handling system performs additional actions comprising:

receiving a maximum partition size bounding that corresponds to the first virtual function, wherein the memory partition is dynamically resized up to the maximum partition size bounding.

11. The computer program product of claim 9 wherein the information handling system performs additional actions comprising:

identifying a different memory partition in the memory area that corresponds to a different virtual function;

determining that the different memory partition includes one or more available memory slots; and allocating, during the dynamically resizing, one or more of the available memory slots to the memory partition corresponding to the first virtual function.

12. The computer program product of claim 11 wherein the memory partition and the allocated memory slots are non-contiguous.

13. The computer program product of claim 9 wherein the information handling system performs additional actions comprising:

identifying a source virtual machine and a different destination virtual machine that correspond to a selected one of the one or more data packets;

determining that none of the one or more physical path translation entries stored in the memory partition correspond to both the source virtual machine and the different destination virtual machine;

sending a translation request to a distributed policy service for a new physical path translation entry, the translation request identifying the source virtual machine and the different destination virtual machine;

receiving the new physical path translation entry from the distributed policy service; and storing the new physical path translation entry in the memory partition.

14. The computer program product of claim 13 the selected data packet is sent from the source virtual machine to the different destination virtual machine using the new physical path translation entry over one or more virtual networks, wherein each of the one or more virtual networks is independent of physical topology constraints of a physical network.

15. The computer program product of claim 14 wherein:

the new physical path translation entry includes a source overlay network identifier and a destination overlay network identifier;

the source overlay network identifier identifies a first virtual network that corresponds to the source virtual machine, the first virtual network included in the one or more virtual networks;

the destination overlay network identifier identifies a second virtual network that corresponding to the destination virtual machine, the second virtual network included in the one or more virtual networks; and the first virtual network is different than the second virtual network.

16. An information handling system comprising:

one or more processors;

a memory coupled to at least one of the processors;

a set of computer program instructions stored in the memory and executed by at least one of the processors in order to perform actions of:

receiving a preferred partition size and a maximum partition size bounding that corresponds to a first virtual function executing on a network adapter;

allocating, in the memory area, a memory partition based on the preferred partition size, the memory partition corresponding to the first virtual function;

storing one or more physical path translation entries in the memory partition, wherein each of the one or more physical path translations include a physical address of a destination host, and wherein a selected one of the physical addresses is appended to one or more data packets traversing through the first virtual function and targeted to a destination virtual machine executing on a corresponding one of the destination hosts; and sending the appended data packets from the network adapter to the destination virtual machine executing on the destination host; and dynamically resizing the memory partition up to the maximum partition size bounding based upon an amount of the memory partition utilized to store the one or more translation entries.

* * * * *